(12) United States Patent
Kubel et al.

(10) Patent No.: US 9,328,612 B2
(45) Date of Patent: May 3, 2016

(54) RETROFITTING METHODS AND DEVICES FOR LARGE STEAM TURBINES

(71) Applicant: ALSTOM TECHNOLOGY LTD., Baden (CH)

(72) Inventors: Sigurd Kubel, Ehrendingen (CH); Rolf Hunziker, Dintikon (CH)

(73) Assignee: ALSTOM TECHNOLOGY LTD, Baden (CH)

( * ) Notice: Subject to any disclaimer, the term of this patent is extended or adjusted under 35 U.S.C. 154(b) by 811 days.

(21) Appl. No.: 13/631,882

(22) Filed: Sep. 29, 2012

(65) Prior Publication Data

US 2013/0156587 A1  Jun. 20, 2013

(30) Foreign Application Priority Data

Sep. 30, 2011 (EP) .................................. 11183509

(51) Int. Cl.
*F01D 5/30* (2006.01)
*B23P 6/00* (2006.01)
*F01D 5/00* (2006.01)
*F01D 5/28* (2006.01)

(52) U.S. Cl.
CPC ................ *F01D 5/005* (2013.01); *B23P 6/005* (2013.01); *F01D 5/282* (2013.01); *F01D 5/3007* (2013.01); *Y02T 50/672* (2013.01); *Y10T 29/49318* (2015.01)

(58) Field of Classification Search
CPC .... F01D 5/3092; F05D 2230/70; B23P 6/005
See application file for complete search history.

(56) References Cited

U.S. PATENT DOCUMENTS

| 3,132,841 | A | * | 5/1964 | Wilder, Jr. | ............... F01D 5/282 |
| | | | | | 416/219 R |
| 3,713,752 | A | | 1/1973 | Kurti | |
| 3,883,267 | A | | 5/1975 | Baudier et al. | |
| 4,343,593 | A | | 8/1982 | Harris | |
| 4,417,854 | A | * | 11/1983 | Cain | ....................... F01D 5/284 |
| | | | | | 416/219 R |

(Continued)

FOREIGN PATENT DOCUMENTS

| CN | 1932248 A | 3/2007 |
| EP | 1905954 A1 | 4/2008 |

(Continued)

OTHER PUBLICATIONS

Office Action/Search Report issued on Jun. 23, 2014, by the Chinese Patent Office in corresponding Chinese Patent Application No. 201210377181.0 and an English translation of the Office Action/Search Report. (15 pages).

(Continued)

*Primary Examiner* — Nathaniel Wiehe
*Assistant Examiner* — Jason Davis
(74) *Attorney, Agent, or Firm* — Buchanan Ingersoll & Rooney PC (57) ABSTRACT

A method of replacing rotating metal blades of a steam turbine inserted into a rotor having one or more existing grooves for inserting root sections of the metal blades is described, the method including the steps of providing replacement blades having radially inwards directed root sections of fiber-reinforced composite material, changing the shape of the one or more grooves in the rotor to form a cavity for the insertion of the root sections of fiber-reinforced composite material and inserting the replacement blades into the rotor.

6 Claims, 7 Drawing Sheets

(56) References Cited

U.S. PATENT DOCUMENTS

| | | | |
|---|---|---|---|
| 4,869,645 A | 9/1989 | Verpoort | |
| 5,318,406 A | 6/1994 | Bardes | |
| 8,206,118 B2* | 6/2012 | Propheter-Hinckley | F01D 5/3007 416/219 R |
| 2006/0251521 A1 | 11/2006 | Hernandez et al. | |
| 2007/0065291 A1 | 3/2007 | Karafillis | |
| 2010/0061858 A1 | 3/2010 | Jones | |
| 2010/0189562 A1 | 7/2010 | Blanchard et al. | |
| 2011/0299994 A1* | 12/2011 | Behnisch | F01D 5/282 416/230 |
| 2012/0201691 A1 | 8/2012 | Dautl et al. | |
| 2012/0207608 A1 | 8/2012 | Ebert et al. | |

FOREIGN PATENT DOCUMENTS

| | | |
|---|---|---|
| JP | 63252663 A | 10/1988 |
| JP | 2004263701 A | 9/2004 |
| JP | 2007177775 A | 7/2007 |
| WO | 2011039075 A1 | 4/2011 |
| WO | 2011044876 A1 | 4/2011 |

OTHER PUBLICATIONS

Office Action (Notification of Reasons for Refusal) issued on Mar. 24, 2014, by the Japanese Patent Office in corresponding Japanese Patent Application No. 2012-215780, and an English Translation of the Office Action. (4 pages).

* cited by examiner

RETROFITTING METHODS AND DEVICES FOR LARGE STEAM TURBINES

CROSS REFERENCE TO RELATED APPLICATION

The present application hereby claims priority under 35 U.S.C. Section 119 to European Patent application number 11183509.6, filed Sep. 30, 2011, the entire contents of which are hereby incorporated by reference.

BACKGROUND

The present invention relates to methods and devices for retrofitting large steam turbines, particularly low pressure steam turbines and even more specifically the last or next to last stage of low pressure steam turbines.

In the following description the term "turbine" is used to refer to rotary engines having a rotating part and a stator part force coupled by a fluid medium such as water, steam or gas. Of particular interest for the present invention are axial steam turbines comprising radially arranged fixed stator blades or vanes alternating with radially arrangements of moving rotor blades force-coupled by a flow of steam through the turbine. Movements are generally defined as movements relative to a casing or housing.

In large turbines, particularly steam turbines, the moving blades or airfoils are presently manufactured using steel or titanium based alloys. In a multi-stage turbine, the size of the blades increases from stage to stage. In the final stage of the largest low pressure turbines the height of a turbine blade can exceed one meter. While it is desirable to increase the size of the turbine stages and thereby increase their exhaust surface and efficiency, the properties of current materials have reached theirs limits mainly because of the large centrifugal forces acting on the rotating blades.

To overcome the barriers set by the materials properties of steel and titanium, composite material airfoils have been proposed using mainly carbon fiber based materials. Though a large number of such designs has been published, real-world applications of such composite blades are currently limited to gas turbines for advanced aircrafts engines.

The moving blades are usually mounted onto the turbine rotor using root sections on the blades, for example the so-called "fir trees", which mechanically lock into slots cut into disks on the rotor. However the optimal root for an airfoil made of fiber-reinforced composite material is typically different from the root sections of conventional metal airfoils. This difference makes it difficult to replace metal airfoils by composite airfoils when repairing, upgrading or retrofitting an existing turbine which was originally designed for metal blades.

U.S. Pat. No. 3,883,267 proposes a blade for a fluid dynamic machine with an air-foil section constituted by the superimposition upon a metal core, of a plurality of superimposed layers of composite fibrous material, said metal core having a portion which projects beyond said airfoil section in order to act as a blade attachment root.

In view of the known prior art, it is seen as an object of the invention to provide methods and devices which facilitate the retrofitting of large turbines with airfoils or blades of advanced materials such as composite fiber materials.

SUMMARY

The present disclosure is directed to a method of replacing rotating metal blades, of a steam turbine, inserted into a rotor having at least one existing groove that receive root sections of the metal blades. The method includes providing replacement blades having radially inwards directed root sections of fiber-reinforced composite material; changing a shape of the at least one groove in the rotor to provide cavities for the insertion of the root sections of fiber-reinforced composite material; and inserting the replacement blades into the rotor.

The present disclosure is also directed to an adapter for replacing rotating metal blades of a steam turbine inserted into a rotor having at least one existing groove, configured to receive root sections of the metal blades, with replacement blades having radially inwards directed root sections of fiber-reinforced composite material. The adapter includes at least one section matching at least part of the at least one existing groove for fixing the adapter to the rotor and at least one cavity portion to accommodate the radially inwards directed root sections of fiber-reinforced composite material.

BRIEF DESCRIPTION OF THE DRAWINGS

Exemplary embodiments of the invention will now be described, with reference to the accompanying drawings, in which.

DETAILED DESCRIPTION

Introduction to the Embodiments

According to an aspect of the present invention, there is provided a method of replacing rotating metal blades of a steam turbine inserted into a rotor having one or more grooves for inserting root sections of the metal blades, the method including the steps of providing replacement blades having radially inwards directed end sections of fiber-reinforced composite material, changing the shape of the one or more grooves in the rotor to provide a cavity for the insertion of the end sections of fiber-reinforced composite material and inserting the replacement blades into the rotor.

The rear stages of a steam turbine usually have no circumferential but axially oriented grooves, which usually include an angle to the rotor axis. The trajectory of the grooves can be either straight or curved. In the case of pinned root blades, the grooves in the rotor are however circumferential and can be formed as slots.

When referring to a radial direction, such direction is defined as the radial direction from the rotational axis of the turbine rotor.

According to a preferred embodiment of this aspect of the invention, the shape of the one or more grooves is changed by machining an altered groove profile into the rotor and/or by inserting adapters into the grooves.

In a preferred embodiment of this aspect of the invention, the end sections of fiber-reinforced composite material extend after insertion into the altered groove profile in the rotor and/or the adapters such that the end sections are separated from steam in the turbine by at least one layer of metal.

In a variant of this embodiment, the end sections of fiber-reinforced composite material either extend into the grooves or the adapters include a cavity extending radially outward beyond the outer diameter of the rotor into which cavity the end sections of fiber-reinforced composite material are inserted.

In a preferred embodiment, the adapter includes sections which match the original groove shape, such that these parts of the original groove can continue to serve as means for fixing the adapter and the root of the replacement blade to the rotor. In a preferred variant, the sections which match the original groove shape include the first and the bottom teeth or hooks, in case the original root is a fir-tree type root.

Another aspect of the invention includes adapters for replacing rotating metal blades of a steam turbine inserted into a rotor having one or more existing grooves for inserting root sections of the metal blades by replacement blades having radially inwards directed root sections of fiber-reinforced composite material, wherein the adapter comprises at least one section matching at least part of the existing grooves for fixing the adapter to the rotor and at least one cavity portion to accommodate the radially inwards directed root sections of fiber-reinforced composite material. In case of the original root being a fir-tree type root, the section which matches the original groove shape can include the first and the bottom teeth or hooks.

These and further aspects of the invention will be apparent from the following detailed description and drawings as listed below.

Detailed Description

Aspects and details of examples of the present invention are described in further details in the following description using the example of a last stage rotor blade for a low pressure (LP) steam turbine.

Figure 1:
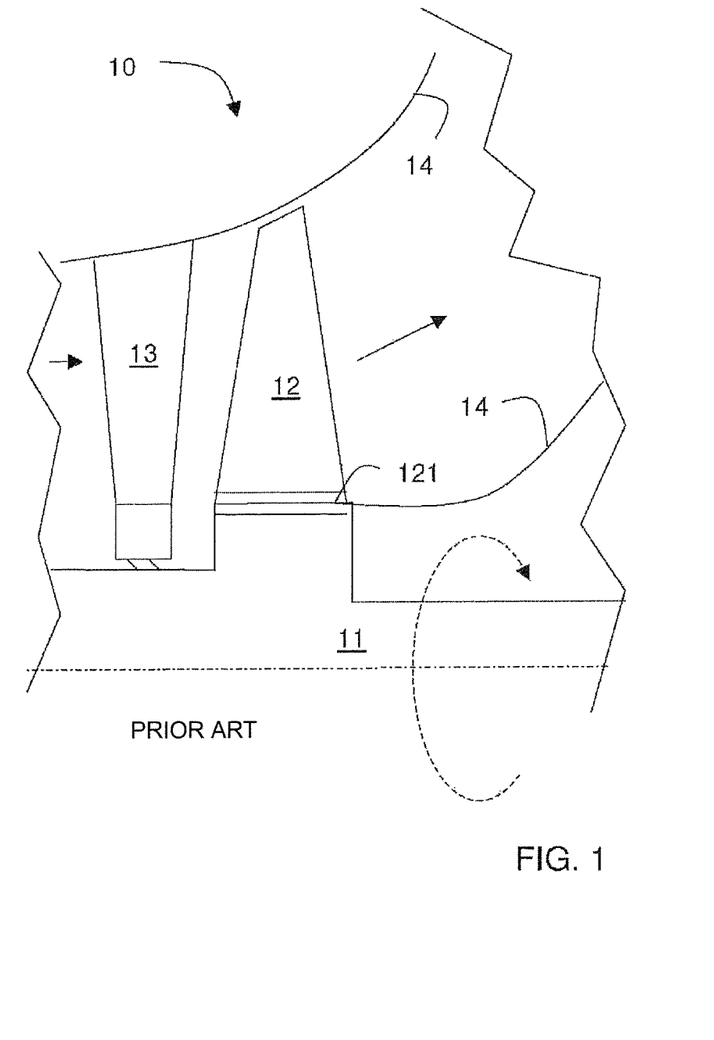
FIG. 1 shows a schematic vertical cross-section through the last stage of a conventional steam turbine design.

Referring to FIG. 1 there is shown is a schematic vertical cross-section through the upper half to the rotational axis of the last stage of a conventional multi-stage steam turbine 10 for axial flow. The turbine includes a rotor 11 made typically of 3.5% CrNiMoV steel. Attached to the rotor or a disk welded to the rotor are a plurality of rotating blades or airfoils 12. Each blade 12 has a root section, which is slotted during assembly of the turbine 10 into matching grooves 121 cut into the rotor disk. The steam enters the last stage through a diaphragm with a plurality of stationary nozzle blades 13. After leaving the last stage the steam enters an annular passage 14, the diffuser, leading to a condenser (not shown). The moving blades 12 are typically machined or forged from steel alloy (e.g. 12% Cr steel) or titanium alloy. For the known turbines, the radial length of the last stage rotating blades 12 is typically in the range of 1 m to 1.5 m for the most powerful steam turbine designs.

In retrofitting, a turbine as shown in the example of FIG. 1 is typically to be repaired or upgraded by replacing parts of the existing turbine. In accordance with the following examples of the present invention, the old rotor 11 is not replaced by a new rotor, however, the old moving blades 12 are replaced by blades at least partially made of fiber-reinforced composite material.

Composite airfoils or blade are known as such. They can for example be prepared using the known vacuum infusion process. In this process a woven mesh of fibers is spread in a die, which approximates the shape of the airfoil to be manufactured. Additional fiber material is added at the tip of the airfoil to the strands or woven mats. After adding fiber material at the tip, the fiber material is impregnated under vacuum conditions in the die with the matrix material such as resin.

Other known manufacturing methods such as hand laminating can be used. Variants such as prepreg, wet layup or resin transfer molding can also be applied. An overview of known method to produce a core of composite material is published for example in U.S. Patent Application Publication No. US2012/0207608, which is incorporated herein by reference. However for the purpose of the present invention and the sake of clarity, no further details of these standard methods are reiterated herein.

Figure 2A:
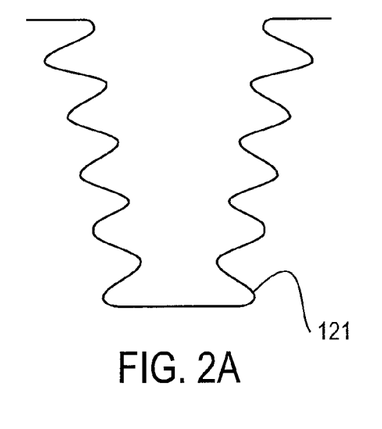
FIGS. 2A and 2B show, schematically an adapted groove in the rotor of an existing turbine to fit a replacement blade of composite material in accordance with an example of the invention.
Figure 2B:
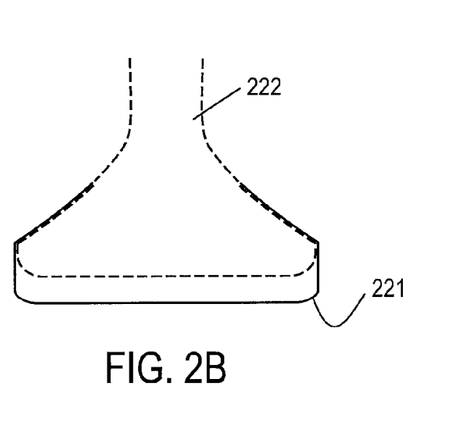

In the example of FIGS. 2A and 2B, the existing grooves 121 are subject to a re-machining step, leaving a new groove profile 221 overlaying the old one. Here, the same technology with similar tools can be applied as for the original geometry, e.g. milling or broaching. In the example, the new groove profile 221 is a simple dovetail as is suitable for many composite-type blades or airfoils. The dashed line 222 indicates the root section of such a blade. Existing gaps and cavities between the old and the profile can be closed with additional adapters. Alternatively or additionally, the remaining gaps can be closed by shaped parts and/or filled by polymers or composites.

It is seen as advantageous to fill these remaining gaps by short-fiber reinforced synthetic materials as CFRP (carbon fiber reinforced polymer), CMC (ceramic matrix composites) or MMC (metal matrix composites).

Figure 3:
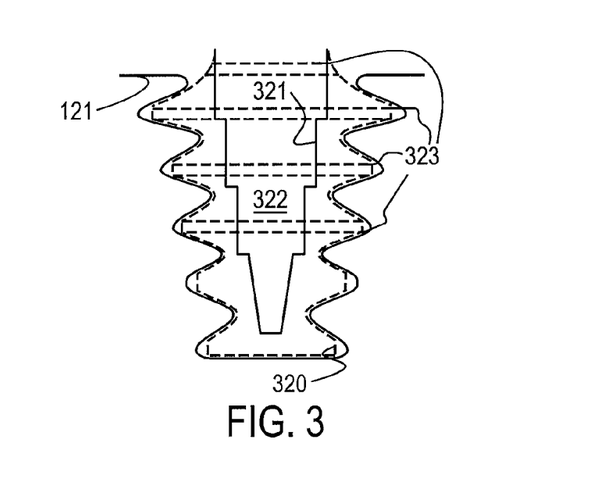
FIG. 3 illustrates schematically the use of an adapter in a rotor groove of an existing turbine to fit a replacement blade of composite material in accordance with an example of the invention.

In the example of FIG. 3, the old rotor-groove profile 121 is unchanged. An adapter piece 320 is inserted which has the same outer profile as the original (metallic) blade and hence fits in the same way as the root section of the old blades. The adapter piece 320, however, provides a new inner profile 321, which is meant to house the composite blade aerofoil. In the example, the new, inner groove profile 321 is adapted to match a fir-tree type root 322 to be secured by additional pins 323. Other contours are also possible, e.g. straight grooves, stepped grooves or dove-tail shaped grooves. In any of these alternatives, the composite could be optionally secured with one or more bolts.

It is seen as an advantage of this embodiment that the adapter piece 320 can provide any other desired profile to match a given root of the composite-type blades or airfoils. It is further seen as an important advantage of the present invention to provide adapters and methods to adapt an existing groove such that the transition between any part of the root of a blade made of composite material occurs within the metal structure of the adapter. In other words, the adapter encloses the composite root section of the blade.

Such adapter pieces can be shaped to include radially projecting outer walls to form at least part of a cavity. The metallic root adapter then forms an outer envelope to protect the root section and the lower foot section of the composite airfoil. This has the advantage, that the protruding/outer metallic region additionally provides better protection against water droplet erosion.

Figure 4:
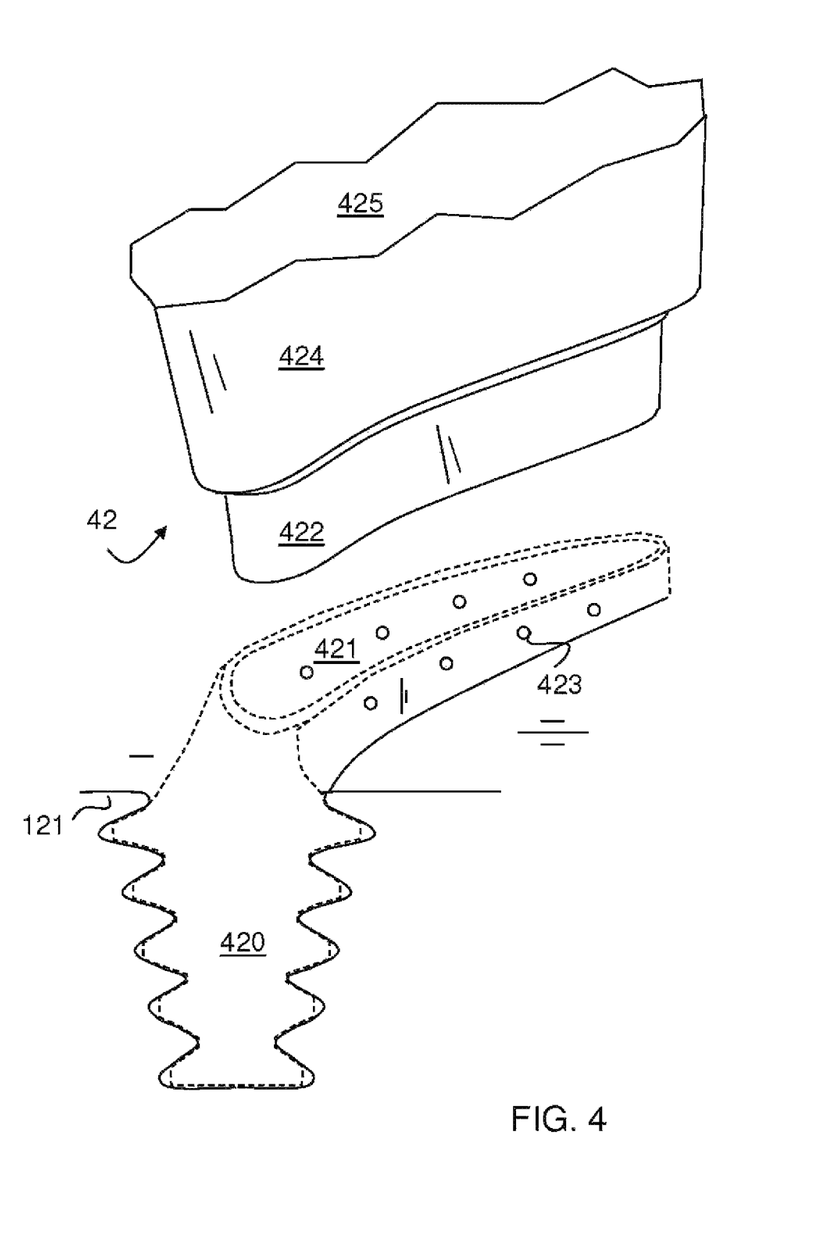
FIG. 4 shows schematically a perspective view of another adapter in a rotor groove of an existing turbine to provide a cavity for a replacement blade of composite material in accordance with an example of the invention.

This further aspect of the invention is specifically illustrated in the example of FIG. 4. In this example the metal adapter 420 includes a cavity part 421 projecting radially outwards from the surface of the top of the original groove 121. The inner dimensions of the cavity match the root section 422 of the blade 42 of fiber-reinforced composite material. The blade is shown at the insertion step. The root section 422 can be fixed within the cavity part 421 of the adapter 420 using adhesive bonding or glue. Alternatively or in addition to adhesive bonding, the root section 422 can be fixed within the cavity part 421 of the adapter 420 with bolts (not shown) inserted into the holes 423 through the wall of the cavity 421 and the root 422 of the blade 42.

Ideally, the outer surface of the adapter is in direct contact with the root-side end of any protective layer 424, which is wrapped around the upper part of the blade 42 to protect the airfoil body 425 of fiber-reinforced composite material from erosion.

A further example in accordance with the present invention is shown in FIGS. 5-8. In the example of FIG. 5A, the existing groove 121, which is again assumed to be originally adapted for a fir tree root, is first machined to remove material 525 from the region around the middle three of the original five anchoring teeth or hooks 523, 524. This step can be considered as being similar to the method illustrated above when referring to FIGS. 2A and 2B. However, in the examples of FIGS. 5-8 care is taken to remove material 525 only from a volume defined by a close contour around the existing groove. It is believed that maintaining as much of the existing rotor body as possible can enhance the stability of the retrofitted blade and its resistance against centrifugal forces.

The outer limits of the volume from which material is removed can be defined by the geometry of the existing groove. One such possible definition is the volume formed when projecting the boundaries formed of the largest width (in circumferential direction for a fir tree root) of the existing groove, typically assumed at the top of the groove, either as parallels equidistant from the center as shown in FIG. 5A as dashed lines 521 or radially through the center of the rotor.

Figure 5A:
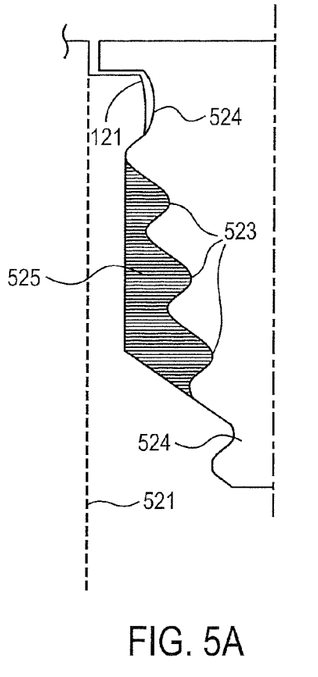
FIGS. 5A and 5B show, schematically, variants of an adapted groove in the rotor of an existing turbine fitted to accommodate an adapter, which in turn provides a cavity for a replacement blade of composite material in accordance with further examples of the invention.
Figure 5B:
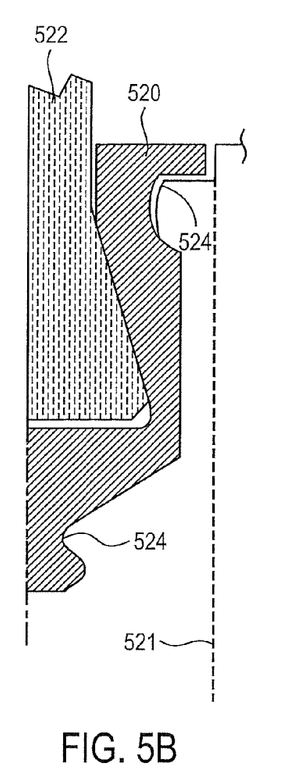

FIG. 5A shows a schematic cross-section during the stage of removing a block of material 525 including teeth from the original groove 121. FIG. 5B shows a schematic cross-section section at a stage after the insertion of an adapter 520 and of the composite material root 522 of the airfoil. The groove 121 thus modified is filled by the adapter 520, which provides a cavity for the inner end of the airfoil 522 of composite material. The airfoil 522 is shown in the example to have a dove tail end. The adapter 520 is held in place by the remaining teeth 524 of the original groove including the bottom tooth and the top tooth.

By keeping the existing bottom groove essentially intact, the backing and axial locking mechanism which supported the original fir tree root can be reused for the adapter and hence for the composite fiber airfoil of the refit.

Figure 6A:
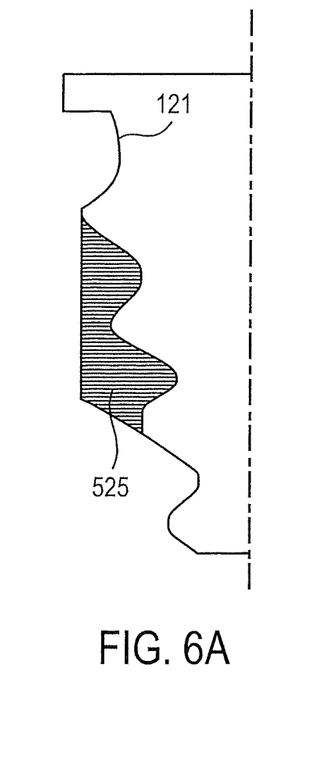
FIGS 6A and 6B show, schematically, variants of an adapted groove in the rotor of an existing turbine fitted to accommodate an adapter, which in turn provides a cavity for a replacement blade of composite material in accordance with further examples of the invention.
Figure 6B:
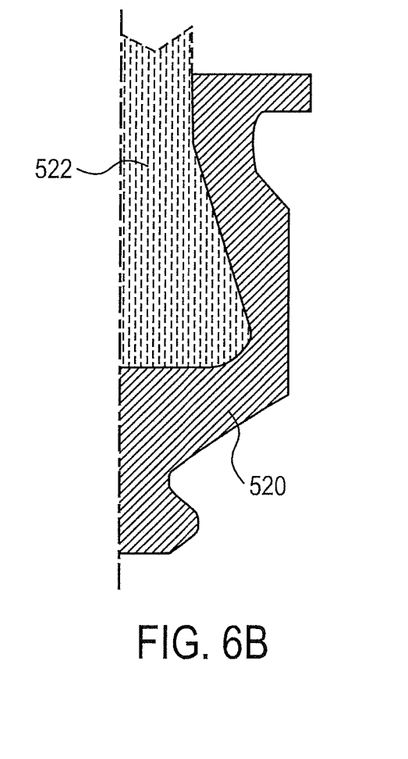
Figure 7A:
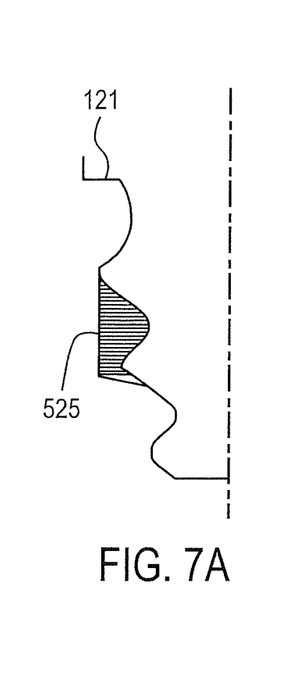
FIGS. 7A and 7B show, schematically, variants of an adapted groove in the rotor of an existing turbine fitted to accommodate an adapter, which in turn provides a cavity for a replacement blade of composite material in accordance with further examples of the invention.
Figure 7B:
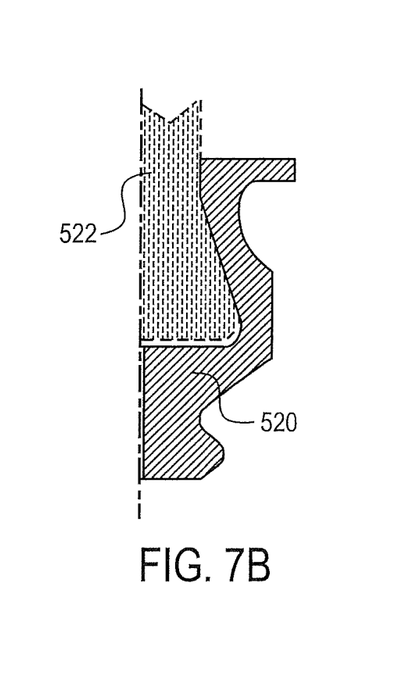

The example of FIG. 5 is illustrated in further variants in FIGS. 6-8 using the same numerals to denote the same or similar elements as shown in FIG. 5. The variants are from left to right a four (FIGS. 6A and 6B) and a three tooth (FIGS. 7A and 7B) fir tree groove. As in FIG. 5A and 5B, the figures show, on the left half, a schematic cross-section during the stage of removing material 525 from the original groove 121, and a schematic cross-section section at a stage after the insertion of an adapter 520 and of the composite material root 522 of the airfoil.

Figure 8A:
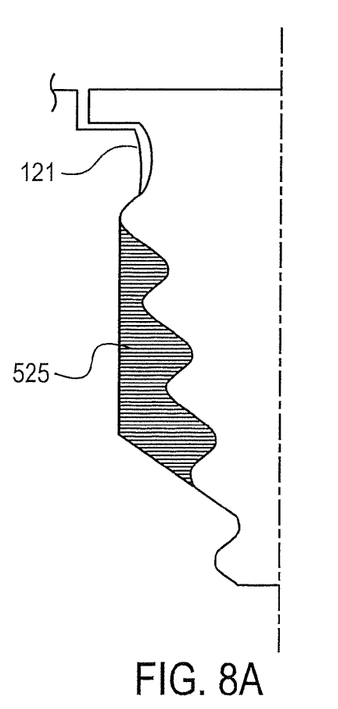
FIGS. 8A and 8B show, schematically, variants of an adapted groove in the rotor of an existing turbine fitted to accommodate an adapter, which in turn provides a cavity for a replacement blade of composite material in accordance with further examples of the invention.
Figure 8B:
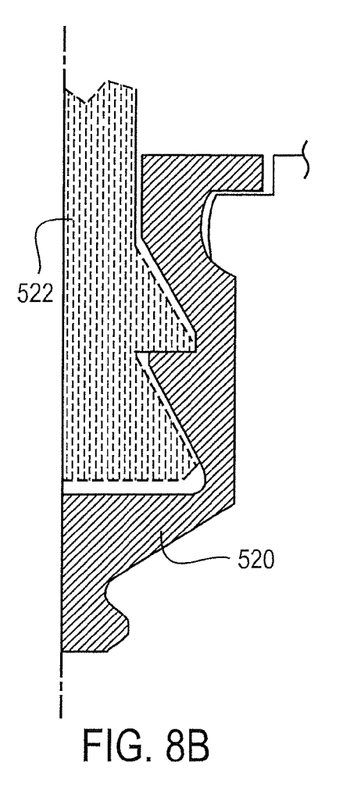

The above methods and the adapter utilized can be readily altered to match different root geometries as demonstrated in FIGS. 8A and 8B. The root 522 of composite material is shown as a double dovetail geometry. However, other geometries such as pinned roots can also be accommodated.

The present invention has been described above purely by way of example, and modifications can be made within the scope of the invention, including for example the adaptation to different shapes of roots of the composite material blade. The invention also consists in any individual features described or implicit herein or shown or implicit in the drawings or any combination of any such features or any generalization of any such features or combination, which extends to equivalents thereof. Thus, the breadth and scope of the present invention should not be limited by any of the above-described exemplary embodiments.

Each feature disclosed in the specification, including the drawings, may be replaced by alternative features serving the same, equivalent or similar purposes, unless expressly stated otherwise.

Unless explicitly stated herein, any discussion of the prior art throughout the specification is not an admission that such prior art is widely known or forms part of the common general knowledge in the field.

LIST OF REFERENCE SIGNS AND NUMERALS multi-stage steam turbine 10
rotor 11
blades or airfoils 12
grooves 121
stationary nozzle blades 13
annular passage 14
new groove profile 221
dashed line indicating the root section 222
adapter piece 320
new inner groove profile 321
fir-tree type root 322
securing pins 323
metal adapter 420
cavity part 421
root section 422
blade 42
holes for securing bolts 423
protective layer 424
airfoil body 425
adapter 520
dashed lines indicating boundary 521
composite material root and airfoil 522
(removed) teeth 525
(remaining) teeth 524

What is claimed is:
1. A method of replacing rotating metal blades of a steam turbine inserted into a rotor having at least one existing groove configured to receive root sections of the metal blades, the method comprising:
   providing replacement blades having radially inwards directed root sections of fiber-reinforced composite material;

changing a shape of the at least one groove in the rotor to provide a cavity for the insertion of the root sections of fiber-reinforced composite material;

inserting the replacement blades into the rotor; and wherein the at least one existing groove has several teeth or hooks and the shape of the at least one existing groove is changed by machining an altered groove profile into the rotor such that at least top and bottom teeth remain without significant alterations.

2. The method of claim 1 comprising:

inserting adapters into the altered groove profile, wherein the adapter is hooked onto the remaining at least top and bottom teeth.

3. The method of claim 2 wherein the root sections of fiber-reinforced composite material extend into the altered groove profile in the rotor and the adapters such that the root sections are separated from steam in the turbine by at least one layer of metal.

4. The method of claim 3 wherein a transition between fiber-reinforced composite material of the root section of the blades and the metal occurs within a body of the adapter.

5. The method of claim 2 wherein the root sections of fiber-reinforced composite material extend into the adapters which include a cavity extending radially outward beyond an outer diameter of the rotor into which cavity the root sections of fiber-reinforced composite material are inserted.

6. The method of claim 1 wherein the root sections of fiber-reinforced composite material extend into the altered groove profile.

\* \* \* \* \*